(12) United States Patent
Mehr

(10) Patent No.: US 10,542,021 B1
(45) Date of Patent: Jan. 21, 2020

(54) AUTOMATED EXTRACTION OF BEHAVIORAL PROFILE FEATURES

(71) Applicant: Amazon Technologies, Inc., Reno, NV (US)

(72) Inventor: Nima Sharifi Mehr, Vancouver (CA)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 269 days.

(21) Appl. No.: 15/187,532

(22) Filed: Jun. 20, 2016

(51) Int. Cl.
*H04L 29/06* (2006.01)
*G06F 16/23* (2019.01)

(52) U.S. Cl.
CPC ...... *H04L 63/1425* (2013.01); *G06F 16/2358* (2019.01); *H04L 63/102* (2013.01); *H04L 63/1416* (2013.01)

(58) Field of Classification Search
CPC ............... H04L 63/1408; H04L 63/145; H04L 63/1425; H04L 63/102; H04L 63/1416; G06F 16/2358
See application file for complete search history.

(56) References Cited

U.S. PATENT DOCUMENTS

| | | | | |
|---|---|---|---|---|
| 9,800,608 B2* | 10/2017 | Korsunsky | ............... | G06F 21/55 |
| 9,807,105 B2* | 10/2017 | Cheng | ................. | H04L 63/1425 |
| 9,923,911 B2* | 3/2018 | Vasseur | ............... | H04L 63/1425 |
| 2005/0278703 A1* | 12/2005 | Lo | ........................ | G06F 11/0709 |
| | | | | 717/126 |
| 2009/0293121 A1* | 11/2009 | Bigus | .................... | G06F 21/316 |
| | | | | 726/22 |
| 2011/0225644 A1* | 9/2011 | Pullikottil | ........... | H04L 63/1425 |
| | | | | 726/11 |
| 2014/0230058 A1* | 8/2014 | Shulman | ................. | H04L 41/16 |
| | | | | 726/23 |
| 2015/0135262 A1* | 5/2015 | Porat | ..................... | G06F 21/552 |
| | | | | 726/1 |
| 2015/0172321 A1* | 6/2015 | Kirti | ....................... | H04L 63/20 |
| | | | | 726/1 |
| 2015/0319185 A1* | 11/2015 | Kirti | .................... | H04L 63/1416 |
| | | | | 726/23 |
| 2016/0065601 A1* | 3/2016 | Gong | .................... | G06F 21/561 |
| | | | | 726/23 |
| 2016/0226901 A1* | 8/2016 | Baikalov | .............. | H04L 63/1425 |
| 2017/0134412 A1* | 5/2017 | Cheng | ................. | H04L 63/1425 |

* cited by examiner

*Primary Examiner* — Trang T Doan
(74) *Attorney, Agent, or Firm* — Hogan Lovells US, LLP

(57) ABSTRACT

Actions in an electronic environment are monitored during a learning period and behavior profiles generated using feature values for those actions. Subsequent behavior can be compared against the profiles to track the anomalies, or mismatches between features of incoming events and features of the profiles. A high percentage of mismatch can make a feature a candidate for exclusion from the behavioral profile. Normalization methods can be applied on features flagged as exclusion candidates. If any normalization sufficiently decreases the mismatch rate, the feature will not be excluded from the behavior profile. Any exclusion candidate feature which does not have an adequate mismatch value after normalization can be removed from tracked features of the corresponding profile. The behavior profile can be used to detect anomalous behavior that deviates from values of the behavior profile.

20 Claims, 8 Drawing Sheets

```
{
    "Records": [{
    {
        "eventVersion": "1.0",
        "userIdentity": {
            "type": "MUser",
            "principalId": "FOO_PRINCIPAL_ID",
            "arn": "arn:m::123456789012:user/Alice",
            "accountId": "123456789012",
            "accessKeyId": "EXAMPLE_KEY_ID",
            "userName": "Alice",
            "sessionContext": {
                "attributes": {
                    "mfaAuthenticated": "false",
                    "creationDate": "2014-03-06T15:15:06Z"
                }
            }
        },
        "eventTime": "2014-03-06T17:10:34Z",
        "eventSource": "ab.foo.com",
        "eventName": "CreateKeyPair",
        "awsRegion": "usa-west-2",
        "sourceIPAddress": "12.12.198.12",
        "userAgent": "sdk-java",
        "requestParameters": {
        "keyName": "mykeypair"
        },
        "responseElements": {
            "keyName": "mykeypair",
            "keyFingerprint": "30:1d:46:d0:5b:ad:7e:1b:b6:70:62:8b:ff:38:b5:e9:ab:5d:b8:21",
            "keyMaterial": "\sensitiveDataRemoved\u003e"
        },
        ... additional entries ...
    ]
}
```

FIG. 3

* eventVersion
* userIdentity.type
* userIdentity.principalId
* userIdentity.arn
* userIdentity.accountId

...
...

* eventTime
* eventSource
* eventName
* awsRegion
* sourceIPAddress
* userAgent
* requestParameters.keyName
* responseElements.keyName
* responseElements.keyFingerprint
* responseElements.keyMaterial

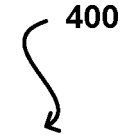

FIG. 4A

* eventVersion -> [ignored]
* userIdentity.type -> [ignored as partition id for profiles]
* userIdentity.principalId -> [ignored as partition id for profiles]
* userIdentity.arn -> [ignored as partition id for profiles]
* userIdentity.accountId -> [ignored as partition id for profiles]
...
...
* eventTime -> 99% mismatch
* eventSource -> 5% mismatch
* eventName -> 2% mismatch
* awsRegion -> 2% mismatch
* sourceIPAddress -> 50% mismatch
* userAgent -> 3% mismatch
* requestParameters.keyName -> 85% mismatch
* responseElements.keyName -> 85% mismatch
* responseElements.keyFingerprint -> 85% mismatch
* responseElements.keyMaterial -> 85% mismatch

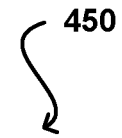

FIG. 4B

AUTOMATED EXTRACTION OF BEHAVIORAL PROFILE FEATURES

BACKGROUND

Users are increasingly performing tasks using remote computing resources, often referred to as part of "the cloud." This has many advantages, as users do not have to purchase and maintain dedicated hardware and software, and instead can pay for only those resources that are needed at any given time, where those resources typically will be managed by a resource provider. In order to attempt to minimize unexpected behavior in a system, as may be the result of an intrusion or security breach, approaches such as behavioral profiling can be used to attempt to detect anomalies in the system. Actions taken in a system can be monitored and recorded throughout a learning period to generate a behavior profile, and any deviations from the learned behavior can be indicative of an anomaly. Such approaches can be problematic, however, as many normal events will be flagged as anomalies due to the changing or variable nature of the values of certain fields. While attempts can be made to exclude these fields, such a generic simplification can increase detection miss rate.

BRIEF DESCRIPTION OF THE DRAWINGS

Various embodiments in accordance with the present disclosure will be described with reference to the drawings, in which:

FIG. 3 illustrates an example file that can be utilized in accordance with various embodiments.

FIGS. 4A and 4B illustrate versions of a flattened file that can be utilized in accordance with various embodiments.

DETAILED DESCRIPTION

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Approaches described and suggested herein relate to the detection of anomalous behavior in an electronic environment. In particular, various approaches provide for the determination of one or more behavioral profiles that can be used to detect anomalous behavior by comparing information for detected actions and events against the expected values from the corresponding behavioral profile. During a learning period, the values of various fields for certain types of actions can be captured and used to generate a behavioral profile for a respective type of action. A value such as a match or mismatch value can be determined that indicates a frequency or ratio with which unexpected values are detected for a respective field. The mismatch values can be updated over a period of time to determine whether the values converge or stabilize. If a mismatch value stabilizes and is within a determined range of mismatch values, for example, then the field can be added to, or approved for, the behavior profile for purposes of anomaly detection. If the mismatch value for the field does not stabilize to an acceptable value, then that field can be flagged as an exclusion candidate. For each exclusion candidate, an attempt can be made to normalize the field in order to aggregate the data for that field with data for other fields of that type or having similar aspects. If the normalized field has a mismatch value that stabilizes to an acceptable value, then the field can be approved for the behavior profile and the normalization process (and any relevant values) can be associated with that field for purposes of anomaly detection. Once the behavior profile is finalized, that profile can be used to analyze subsequent behavior to attempt to identify anomalous behavior. The profiles can be updated over time using data for the recently detected actions.

Various other such functions can be used as well within the scope of the various embodiments as would be apparent to one of ordinary skill in the art in light of the teachings and suggestions contained herein.

Figure 1:
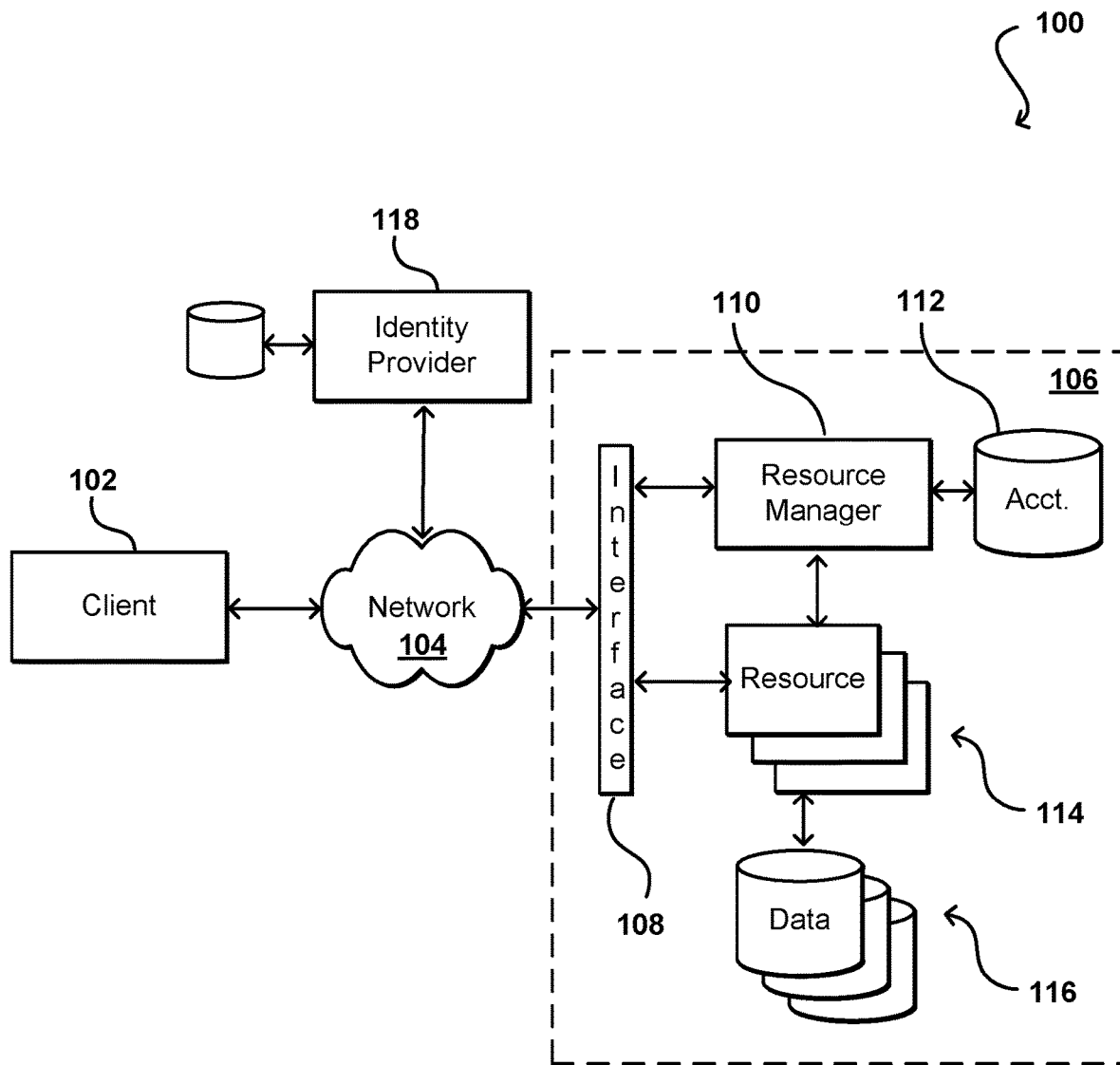
FIG. 1 illustrates an example environment in which various embodiments can be implemented.

FIG. 1 illustrates an example environment 100 in which aspects of the various embodiments can be implemented. In this example a user is able to utilize a client device 102 to submit requests across at least one network 104 to a resource provider environment 106. The client device can include any appropriate electronic device operable to send and receive requests, messages, or other such information over an appropriate network and convey information back to a user of the device. Examples of such client devices include personal computers, tablet computers, smart phones, notebook computers, and the like. The at least one network 104 can include any appropriate network, including an intranet, the Internet, a cellular network, a local area network (LAN), or any other such network or combination, and communication over the network can be enabled via wired and/or wireless connections. The resource provider environment 106 can include any appropriate components for receiving requests and returning information or performing actions in response to those requests. As an example, the provider environment might include Web servers and/or application servers for receiving and processing requests, then returning data, Web pages, video, audio, or other such content or information in response to the request.

In various embodiments, the provider environment may include various types of electronic resources that can be utilized by multiple users for a variety of different purposes. In at least some embodiments, all or a portion of a given resource or set of resources might be allocated to a particular user or allocated for a particular task, for at least a determined period of time. The sharing of these multi-tenant resources from a provider environment is often referred to as resource sharing, Web services, or "cloud computing," among other such terms and depending upon the specific environment and/or implementation. In this example the provider environment includes a plurality of electronic resources 114 of one or more types, including both physical resources (i.e., host machines) and virtual resources (i.e., virtual machines). In particular, these types can include resources such as application servers operable to process instructions provided by a user or database servers operable to process data stored in one or more data stores 116 in response to a user request. As known for such purposes, the user can also reserve at least a portion of the data storage in a given data store. Methods for enabling a user to reserve various resources and resource instances are well known in the art, such that detailed description of the entire process, and explanation of all possible components, will not be discussed in detail herein.

In at least some embodiments, a user wanting to utilize a portion of the resources 114 can submit a request that is received to an interface layer 108 of the provider environment 106. The interface layer can include application programming interfaces (APIs) or other exposed interfaces enabling a user to submit requests to the provider environment. The interface layer 108 in this example can also include other components as well, such as at least one Web server, routing components, load balancers, and the like. When a request to provision a resource is received to the interface layer 108, information for the request can be directed to a resource manager 110 or other such system, service, or component configured to manage user accounts and information, resource provisioning and usage, and other such aspects. A resource manager 110 receiving the request can perform tasks such as to authenticate an identity of the user submitting the request, as well as to determine whether that user has an existing account with the resource provider, where the account data may be stored in at least one data store 112 in the provider environment. A user can provide any of various types of credentials in order to authenticate an identity of the user to the provider. These credentials can include, for example, a username and password pair, biometric data, a digital signature, or other such information. These credentials can be provided by, or obtained from, a number of different entities, such as an identity provider 118, a key management service, a corporate entity, a certificate authority, an identify broker such as a SAML provider, and the like. In some embodiments, a user can provide information useful in obtaining the credentials, such as user identity, account information, password, user-specific cryptographic key, customer number, and the like. The identity provider can provide the credentials to the resource provider environment 106 and/or to the client device 102, whereby the client device can utilize those credentials to obtain access or use of various resources in the provider environment, where the type and/or scope of access can depend upon factors such as a type of user, a type of user account, a role associated with the credentials, or a policy associated with the user and/or credentials, among other such factors.

The resource provider can validate this information against information stored for the user. If the user has an account with the appropriate permissions, status, etc., the resource manager can determine whether there are adequate resources available to suit the user's request, and if so can provision the resources or otherwise grant access to the corresponding portion of those resources for use by the user for an amount specified by the request. This amount can include, for example, capacity to process a single request or perform a single task, a specified period of time, or a recurring/renewable period, among other such values. If the user does not have a valid account with the provider, the user account does not enable access to the type of resources specified in the request, or another such reason is preventing the user from obtaining access to such resources, a communication can be sent to the user to enable the user to create or modify an account, or change the resources specified in the request, among other such options.

Once the user is authenticated, the account verified, and the resources allocated, the user can utilize the allocated resource(s) for the specified capacity, amount of data transfer, period of time, or other such value. In at least some embodiments, a user might provide a session token or other such credentials with subsequent requests in order to enable those requests to be processed on that user session. The user can receive a resource identifier, specific address, or other such information that can enable the client device 102 to communicate with an allocated resource without having to communicate with the resource manager 110, at least until such time as a relevant aspect of the user account changes, the user is no longer granted access to the resource, or another such aspect changes. The same or a different authentication method may be used for other tasks, such as for the use of cryptographic keys. In some embodiments a key management system or service can be used to authenticate users and manage keys on behalf of those users. A key and/or certificate management service can maintain an inventory of all keys certificates issued as well as the user to which they were issued. Some regulations require stringent security and management of cryptographic keys which must be subject to audit or other such review. For cryptographic key pairs where both public and private verification parameters are generated, a user may be granted access to a public key while private keys are kept secure within the management service. A key management service can manage various security aspects, as may include authentication of users, generation of the keys, secure key exchange, and key management, among other such tasks.

The resource manager 110 (or another such system or service) in this example can also function as a virtual layer of hardware and software components that handles control functions in addition to management actions, as may include provisioning, scaling, replication, etc. The resource manager can utilize dedicated APIs in the interface layer 108, where each API can be provided to receive requests for at least one specific action to be performed with respect to the data environment, such as to provision, scale, clone, or hibernate an instance. Upon receiving a request to one of the APIs, a Web services portion of the interface layer can parse or otherwise analyze the request to determine the steps or actions needed to act on or process the call. For example, a Web service call might be received that includes a request to create a data repository.

An interface layer 108 in at least one embodiment includes a scalable set of customer-facing servers that can provide the various APIs and return the appropriate responses based on the API specifications. The interface layer also can include at least one API service layer that in one embodiment consists of stateless, replicated servers which process the externally-facing customer APIs. The interface layer can be responsible for Web service front end features such as authenticating customers based on credentials, authorizing the customer, throttling customer requests to the API servers, validating user input, and marshalling or unmarshalling requests and responses. The API layer also can be responsible for reading and writing database configuration data to/from the administration data store, in response to the API calls. In many embodiments, the Web services layer and/or API service layer will be the only externally visible component, or the only component that is visible to, and accessible by, customers of the control service. The servers of the Web services layer can be stateless and scaled horizontally as known in the art. API servers, as well as the persistent data store, can be spread across multiple data centers in a region, for example, such that the servers are resilient to single data center failures.

As mentioned, there can be situations where a security breach occurs, an availability is compromised, or another such event takes place, whereby the system will not perform as expected. This can be the result of an intruder taking an unexpected action or the software or hardware performing in an unexpected way, among other such possibilities. It can be desirable to detect such events and occurrences as quickly as possible in order to maintain the integrity of the system and minimize any potential damage or modification made as a result. One common approach involves behavioral profiling. In an environment such as the resource provider environment discussed above with respect to FIG. 1, the actions of various users, processes, systems, and services can be monitored and analyzed to attempt to detect anomalies in the operation or performance of the environment. A behavior profile can be generated for the environment, and any deviations from the learned behavior can be indicative of an anomaly. Such approaches can be problematic, however, as many normal events will be flagged as anomalies due to the changing nature of the values of certain fields, such as event time which will generally be different for each new event. While attempts can be made to exclude these fields, such a generic simplification can increase detection miss rate.

Accordingly, approaches in accordance with various embodiments can attempt to improve the accuracy of anomaly detection approaches by, at least in part, looking at the percentage or ratio of mismatch for any feature in a learned behavioral profile in an attempt to intelligently determine which fields to exclude from the profile for the current operation of a specific system or environment. In some embodiments, an anomaly detection system can have a set of built-in normalization methods for common feature types, such as Internet protocol (IP) addresses). These built-in normalizations can be applied to features that were flagged as candidate for exclusion based on the calculated mismatch rate, or another such criterion. For example, if the system notices that a particular field has 50% mismatch rate, the system can apply a normalization to this field to attempt to, for example, view additional data at a higher level or categorization of field type. If the normalizations decreases the mismatch rate to below a specified threshold, then the anomaly detection system can determine to not exclude the feature from the anomaly detection process, and can configure the effective normalization method for ongoing use on the feature-profile. Any exclusion candidate feature which exceeds the threshold even after attempted normalization can be excluded or removed from tracked features of the corresponding profile.

Figure 2:
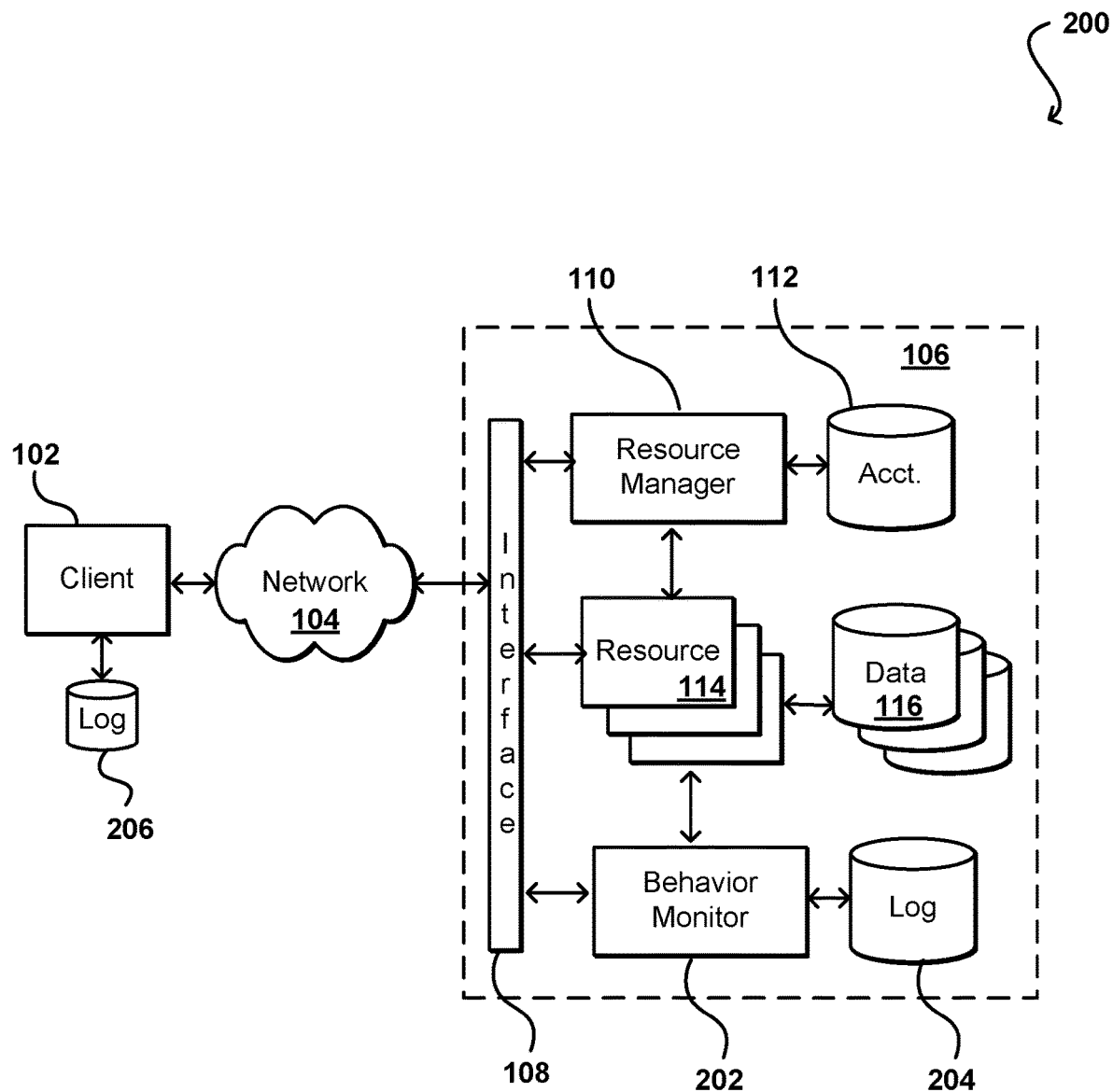
FIG. 2 illustrates an example environment including a behavior monitoring component that can be utilized in accordance with various embodiments.

FIG. 2 illustrates an example system implementation 200 wherein a behavior monitor 202 is able to monitor actions performed in the environment. Although illustrated as a separate component in the resource provider environment 106, it should be understood that a behavior monitor (or other such analysis engine) could be implemented in other locations as well, such as in a process executing on the resource manager 110, as a third party service, on any of the individual resources 114, on the customer side, or in any other appropriate location capable of monitoring behavior of some type. It should also be understood that reference numbers may be carried over between figures for similar elements for simplicity of explanation, but such usage should not be interpreted as requirements or a limitation on the scope of the various embodiments unless otherwise so stated herein. The behavior monitor can communicate with the resources 114 directly or through a resource manager 110 or other such component, among other such options. During a learning process, the behavior monitor can monitor actions taken across the environment and gather the information for subsequent analysis. The field values can be written to a log data store 204 or other such location. In some embodiments, the event data can be written to a log data store 206 managed by the customer, or log data could be stored for events originating from the client side, among other such options. In such embodiments the customer can potentially provide a set of event logs that can be fed directly to the behavior monitor, among other such options. At an end of the learning process, or another appropriate time, the behavior monitor can analyze the data to attempt to determine a mismatch percentage, or other such value, for the various fields. The behavior monitor 202 can also, itself or in combination with another system, attempt to normalize any fields that exceed (or fall below, in some embodiments) a specified threshold or range that have been flagged for potential exclusion. Any fields whose values once normalized still exceed the threshold can be excluded from the relevant profile(s). The behavior monitor can then use these profiles when monitoring subsequent actions across the environment 106 to determine whether values for an action, when compared against the relevant profile, indicate a potential anomaly. For each such anomaly the behavior monitor can trigger or initiate a specific action, such as to generate an alarm or notification for an identified entity or to a determined address or system, etc.

In a specific example, a component or system such as a behavior monitor can attempt to monitor actions of one or more actors (human, electronic, or otherwise) within, or with respect to, a specific system or environment. Information for the actions can be recorded or logged during a learning or baselining period, with a behavior profile being generated or baselined from the observations made during the learning period. For subsequently detected actions in the environment, any deviation from the behavior profile can indicate a potential anomaly, such as a security breach or unavailability. FIG. 3 illustrates an example event log 300 that can be ingested during such a learning process. This particular example has a JSON structure, although other types and formats (i.e., CSV) of event logs and other data can be used as well within the scope of the various embodiments. As illustrated, there are various fields included in the event log as may related to the event version, information about the user, information about the time, source, and location of the event, etc.

A naive approach to building a behavioral profile, using event logs with such a data structure, involves flattening the JSON structure and taking each of a set of fields (all or a subset of the fields) as a profile feature. FIG. 4A illustrates an example flattened file 400 including profile features that can be generated using the naive approach. As can be seen from analyzing the example flattened file, there are fields included that, even after baselining, will result in many normal events or actions being flagged as anomalies. For example, the event time value for the eventTime profile field will likely be different for each new event. Similarly, the request and response parameters could take highly variable names in certain systems, such as where each request and response is uniquely identified. As mentioned, one approach to addressing this issue would be to utilize the manual work and knowledge of an engineer about the event logs to only include features in the behavioral profile which are most likely going to be stable after baselining. Using such a simplistic approach, however, can increase the detection miss rate even through the number of false positives would likely decrease. Thus, it can be desirable to implement an approach that can maintain a low false positive rate by only including stable features in a profile while not increasing the anomaly detection miss rate.

As mentioned, approaches in accordance with various embodiments can generate a behavioral profile as discussed above, which can then be improved or updated using a second baselining process or stage. In this second portion of a baselining process, the system behavior can be compared to the behavioral profiles and the anomalies tracked. As an example, the mismatches between the features of the incoming events and the corresponding features captured in the first stage of the profiling process can be compared. For each feature, or at least a specified subset of the features, the misses or anomalies can be tracked. The example file 450 illustrated in FIG. 4B shows the calculated mismatch values for each of the example profile fields. As illustrated, certain profile fields that will necessarily be different between actions, or at least where variation may not be indicative of an anomaly, such as may relate to the identity of the user, can be ignored during the anomaly detection process.

As illustrated, certain fields have very low determined mismatch values. For a type of event, the source, name, region, and agent fields each have mismatch values of less than 5%. Any profile fields with mismatch values below a certain percentage threshold, such as below 10%, 25%, or 50% in some embodiments, can be determined to be useful parameters for anomaly detection and can be included in the behavior profile. As illustrated, however, various other parameters can have relatively high mismatch values. For example, as expected the event time field has a near 100% mismatch value, as very few actions are initiated at precisely the same time. Further, the request and response parameter fields have very high mismatch values, as expected. It is also illustrated that the source IP address field has a mismatch percentage of around 50%. Based on the threshold applied for a particular system, this mismatch value might fall above the threshold or criteria for inclusion, which might cause that profile field to be flagged for exclusion.

For fields such as source IP address, however, some amount of variation is expected and not necessarily indicative of an anomaly. For example, a single user might utilize multiple IP addresses to access a resource or service, including one from a work computer, another one from a cell phone or smart device, and another from a home computer, among other such options. Further, depending upon how IP addresses are configured and assigned, a company might have a large number of possible IP addresses from which requests can be received, which is not necessarily indicative of an anomaly. Excluding the source IP address field from consideration would reduce the number of false positives, but there is value in the source IP address data in detecting anomalies. Accordingly, it can be desirable to attempt to utilize this data in a way that provides value while not significantly increasing the number of false positives.

Accordingly, an approach in accordance with various embodiments can attempt to normalize any profile fields that have been flagged for potential exclusion based upon the calculated mismatch percentage (or other such value). In at least some embodiments, the feature exclusion can occur separately for each profile and not at the system level. In some embodiments, the system can include (or have access to) a set of normalization methods for common feature types, such as IP addresses. These normalization methods can be applied on the features flagged as candidates for exclusion before making a final exclusion decision. For example, after it is determined that the source IP address field has 50% mismatch rate, a geo-location normalization method can be applied on this field. An example geo-location normalization process can compare event data by common attributes, such as country, region, city, service provider, or other such origin type instead of comparing raw IP addresses. For another example normalization process, the time at which the event occurred could be normalized to attempt to determine whether traffic is typically received at certain times of day, day of the week, etc. These normalizations can be applied one after the other, concurrently, or in with an increasing level of aggression, as discussed elsewhere herein. If any of these built-in normalizations decreases the mismatch rate to below the appropriate mismatch threshold, and the mismatch value stabilizes or converges after a period of learning, then that profile field will not excluded from the behavior profile. The effective normalization method can then be configured for ongoing use on the feature profile. For any exclusion candidate feature where a normalization method is not available or does not sufficiently reduce the mismatch percentage, that field can be removed from the tracked features of the corresponding behavior profile. In at least some embodiments, a system administrator or other such entity can have control over which normalization methods are included for, or applicable to, a specific field. For example, one system administrator might be willing to consider IP addresses at a country level, but other administrators may not be willing to utilize such an approach and might instead focus on a region, state, city, or county level at most. In some embodiments there can be a hierarchy or ranking of normalization methods or criteria, and the methods can be applied in order (i.e., from least aggregating to most aggregating) until a sufficient mismatch percentage is obtained or all methods have been supplied without success, among other such options. In some embodiments the normalizer methods have a set of syntax formats as to where and when the methods can be applied, based on aspects such as the feature name or the feature value format (i.e., syntax-specific or feature-specific normalizers). In at least some embodiments customers can provide and implement their own normalization methods, which can take the form of lambda functions or other such approaches, as customers can be more familiar with the expected behaviors, as well as which behaviors would be more indicative of an anomaly for their particular implementation. In some embodiments generic normalizers can be applied to specific fields based upon aspects of that field. For example, it was mentioned that request parameters might be sufficiently different that they do not make sense to track for anomaly purposes. It might be the case, however, that a request parameter value will always have a specific format, length, or range of values. If a normalizer can be applied that can aggregate and analyze data at this level, such that values outside these ranges or values can be detected, then those fields can be included in the profile to attempt to detect anomalies, although looking for a specific aspect of the values rather than at the values themselves.

Different fields might also have different thresholds, weights, or actions associated therewith. For example, a field that may not be particularly indicative of a troublesome anomaly might have a relatively high mismatch allowance threshold or might be weighted very lowly in the anomaly determination. For example, a confidence score might be generated by looking at the variations from all fields of a profile, and some fields might count more towards that confidence score than others. Similarly, different actions might be taken when certain behavioral anomalies are detected. For example, a variation in a first type of field that is considered to not be particularly risky might result in a notification being generated or data being logged. Similarly, a variation in a second type of field that is considered to be risky might cause an alarm to be generated or even operation of the environment to be modified in some way in an attempt to mitigate the risk. Separate criteria can also be specified so that certain field values, such as certain countries or IP addresses that are blacklisted, might generate an alarm or modification.

Figure 5:
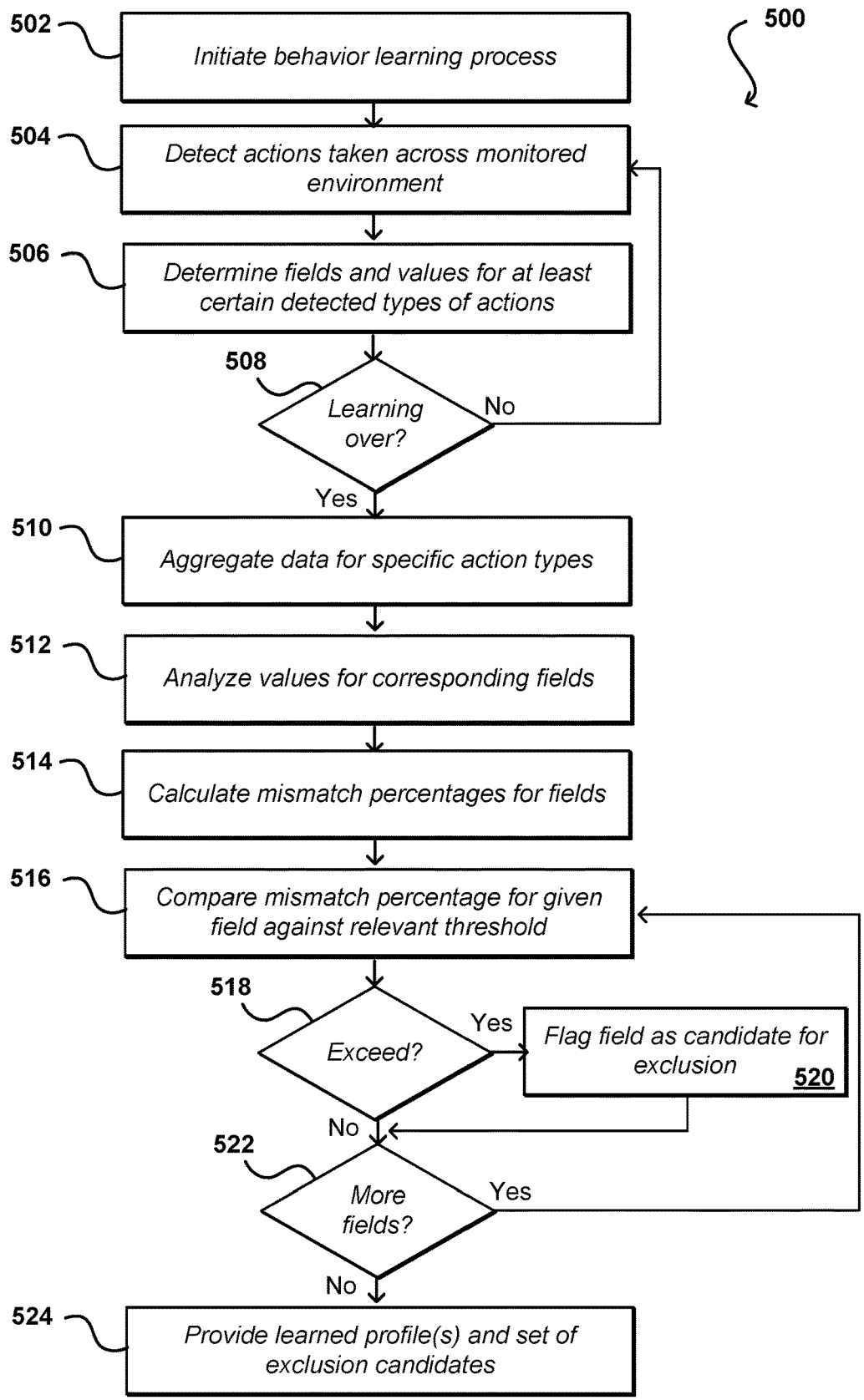
FIG. 5 illustrates an example process for generating a behavior profile that can be utilized in accordance with various embodiments.

FIG. 5 illustrates an example process 500 for generating a behavioral profile that can be used in accordance with various embodiments. It should be understood that for this and other processes discussed herein that additional, fewer, or alternative steps can be performed in similar or alternative steps, or in parallel, within the scope of the various embodiments unless otherwise stated. In this example, a behavior learning process can be initiated 502. The scope of the learning can include any appropriate scope, such as to monitor events on specific data streams, to monitor actions with respect to certain resources or for certain users, etc. The scope can also include actions and resources in an entire environment, a specific subsystem or sub-system, and the like. During the learning process one or more actions taken across the monitored environment can be detected 504. As mentioned, this can involve detecting the action, obtaining information for the action from an event log, or otherwise obtaining information about the action or event. For each detected action, or at least a subset of those actions having one of a specified set of types, the fields and field values for those actions can be determined, and written to a log or other appropriate repository. In some embodiments the structure of an event can be used to attempt to identify the features that define the specific behavior. If it is determined 508 that the learning period is not over, then the monitoring can continue and additional actions detected.

Once the learning period is over, the data for specific actions or action types can be aggregated 510 and the values for the corresponding fields analyzed. This can include, for example, looking for the relative occurrence of various values, a distribution or range of values, etc. As mentioned, the process can also involve flattening of the data structure or file into a canonical or other such form. Based at least in part upon these values a mismatch (or match) percentage, ratio, frequency, or other such value can be calculated 514. In at least some embodiments this calculation can occur over a period of time to attempt to determine whether the match or mismatch value converges or stabilizes with the analysis of additional data. This can represent, for example, the frequency of unexpected values for any specific field of the profile. If the mismatch value is determined 518 to exceed a specified threshold, such as at least 25% or at least 50%, then the field can be flagged 520 for exclusion. As mentioned, in some embodiments a customer or other entity might also request or specify that a field is excluded from consideration, such as where a customer knows that the field values will not stabilize or converge over time. If it is determined 522 there are more fields to analyze, then the process can continue. Once all relevant fields have been analyzed, the learned profile(s) and set or list of exclusion candidates can be stored and/or provided 524 for further analysis. In some embodiments fields that do not stabilize or converge to at least a certain level of certainty may also be flagged for potential exclusion.

Figure 6:
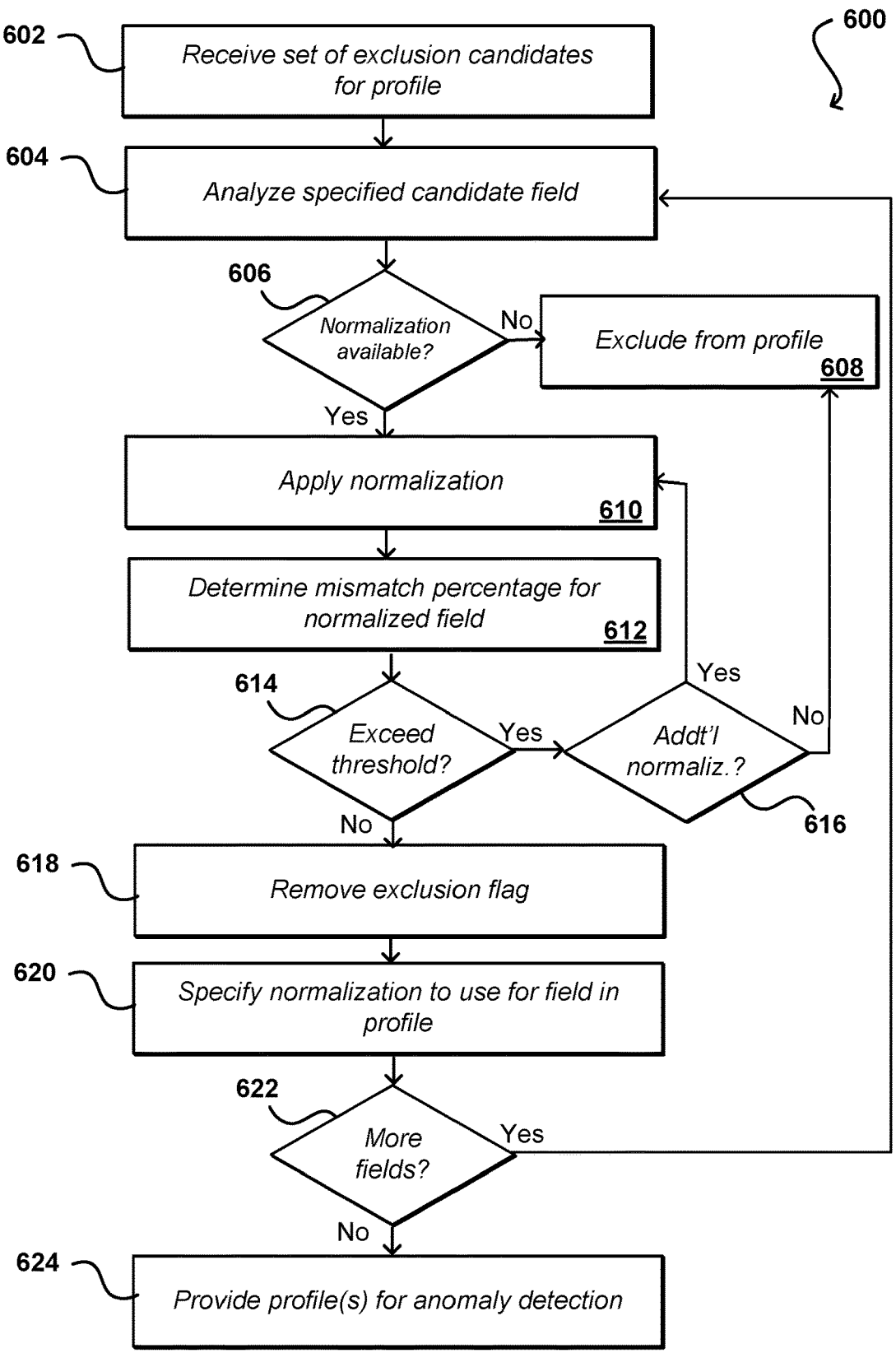
FIG. 6 illustrates an example process for updating a behavior profile using a normalization process that can be utilized in accordance with various embodiments.

FIG. 6 illustrates an example process 600 for updating or improving a behavior profile such as one created with respect to the process of FIG. 5. In this example process 600, the set of exclusion candidates for a profile is received 602 or otherwise obtained, such as from a candidate queue or other such repository. For each exclusion candidate field, the field can be analyzed 604 and a determination made 606 as to determine whether one or more applicable normalization processes can be determined. For example, there might be one or more normalization processes available for the specific field, a type of field, aspects of the field value, or another such aspect. In some embodiments a customer or other entity can also specify a normalization process to use for a certain field or type of field, etc. If no normalization process is available, then the exclusion candidate can be excluded from the profile for purposes of anomaly detection.

If at least one normalization process is available and applicable to the field, the normalization process can be applied 610. As mentioned, there might be multiple levels or values possible for a normalization process, and at least some of these levels can be tested to attempt to determine an appropriate normalization function to be applied. For example, an IP address might be analyzed at various levels of aggregation, such as by service provider, region, state, country, etc. Similarly, usernames might be grouped by substring or prefix, length, format, etc. For at least some of these normalization processes and/or values a mismatch (or match) percentage (or other value) can be determined 612 for the normalized field. A determination can then be made 614 as to whether the normalized mismatch value exceeds the match threshold (or another such value or criterion). If the normalization process does not result in an acceptable mismatch value that is at or under the match threshold, another determination can be made 616 as to whether any additional normalization processing can be applied. As discussed, this can include applying a different level of normalization, dynamically increasing a level of aggression of the normalization, or using a different profile previously generated for a different type or level of normalization, among other such options. If additional normalization options exist, and any applicable rules or criteria indicate to continue attempting normalization, etc., then the normalization process can continue in an attempt to reduce the mismatch percentage to below the match threshold, and in some embodiments to have the percentage stabilize below the threshold. If the value cannot be reduced to below the threshold, then the field can be excluded 608 from the profile for purposes of anomaly detection.

If, however, a normalization process can be identified that results in an acceptable mismatch value, then the exclusion flag can be removed 618 from the field, or the field can otherwise no longer be identified as an exclusion candidate. The appropriate normalization process and value(s) can then be specified 620 for use with that field in the profile. If it is determined 622 that there are more fields to process then the process can continue. Otherwise, the profile(s) can be provided 624 for anomaly detection, whether used for security, availability, or another such purpose.

Figure 7:
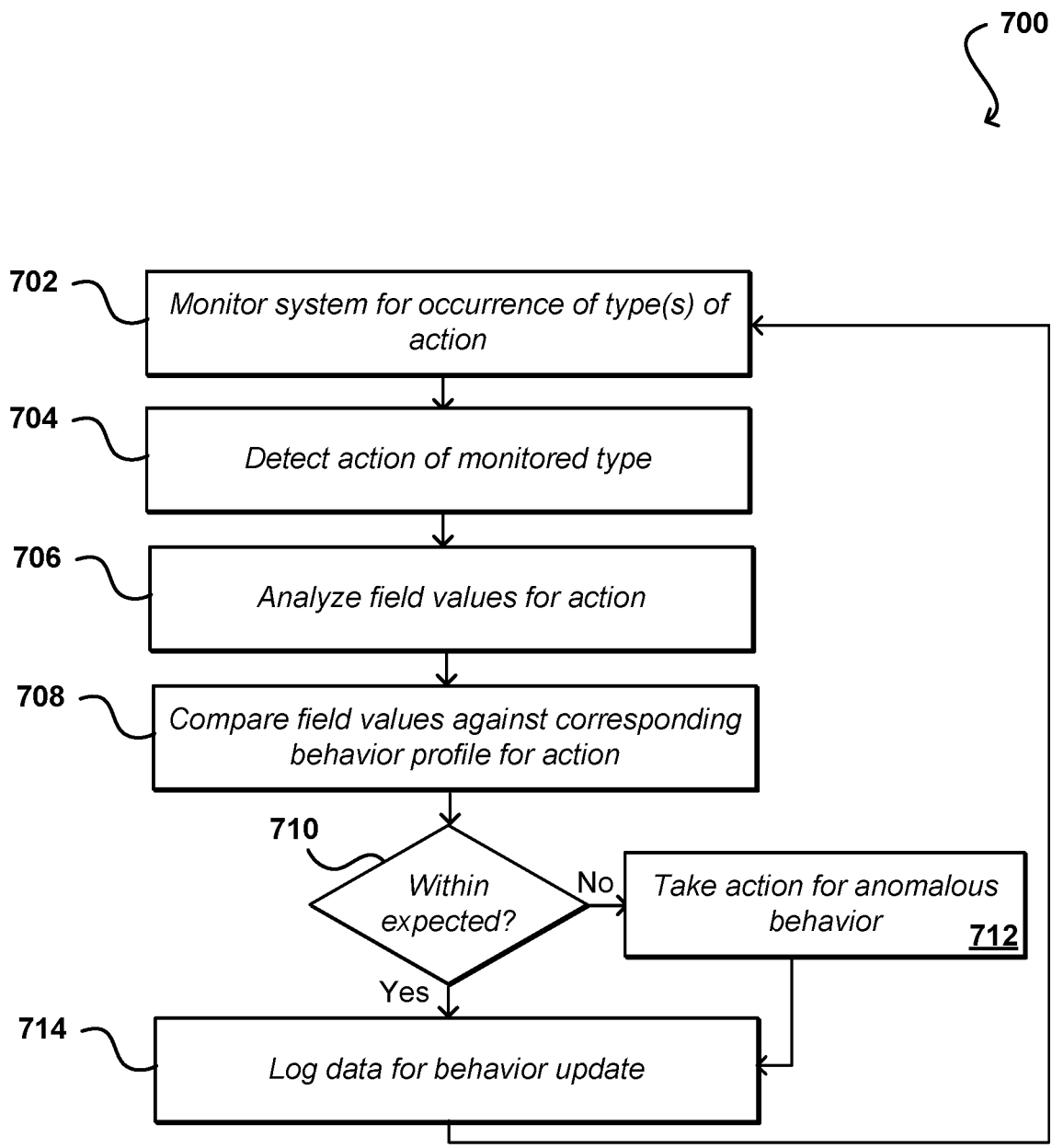
FIG. 7 illustrates an example process for detecting anomalous behavior using a behavior profile that can be utilized in accordance with various embodiments.

FIG. 7 illustrates an example process 700 for detecting anomalies using a behavior profile that can be utilized in accordance with various embodiments. In this example process 700, a system or environment is monitored 702 for the occurrence of actions of one or more types. As mentioned, this can include detecting the actions or obtaining information for the actions from an event queue, among other such options. When an action of one of the monitored types is detected 704, at least some of the field values for the action can be analyzed. Specific fields can then be compared 708 against the relevant fields of a corresponding behavior profile. The profile can be determined using any appropriate approach, such as by analyzing the type of action, source of the action, resource involved in the action, etc. As mentioned, some of the fields of the profile may have been excluded due to those fields not converging or not having values that, when deviated from, can be indicative of an anomaly. For each of the fields (or at least a subset of fields) in the behavior profile, a determination can be made 710 as to whether the mismatch (or match) values for those fields are within an expected range or set of values (i.e., one or more expected value). If not, then an appropriate action can be taken 712 for the potentially anomalous behavior. The action(s) taken can include any action discussed elsewhere herein, such as generating an alarm, setting a flag, blocking a request, etc. The type of action taken in some embodiments may be determined based at least in part upon the type of action, field of the mismatch, or as specified by a customer, among other such options. Regardless of whether an action is taken or anomaly detected, information for the action can be logged 714 for use in updating the behavior profile. As mentioned, various computer or machine learning algorithms (i.e., supervised or unsupervised, neural network-based, regression, decision tree, or Bayesian, etc.) can be used to attempt to update the behavior profile over time. Processes for implementing machine learning for purposes such as anomaly detection are disclosed in co-pending U.S. patent application Ser. No. 15/165,221, filed May 26, 2016, and entitled "System for Determining Anomalies Associated with a Request," which is hereby incorporated herein in its entirety.

Figure 8:
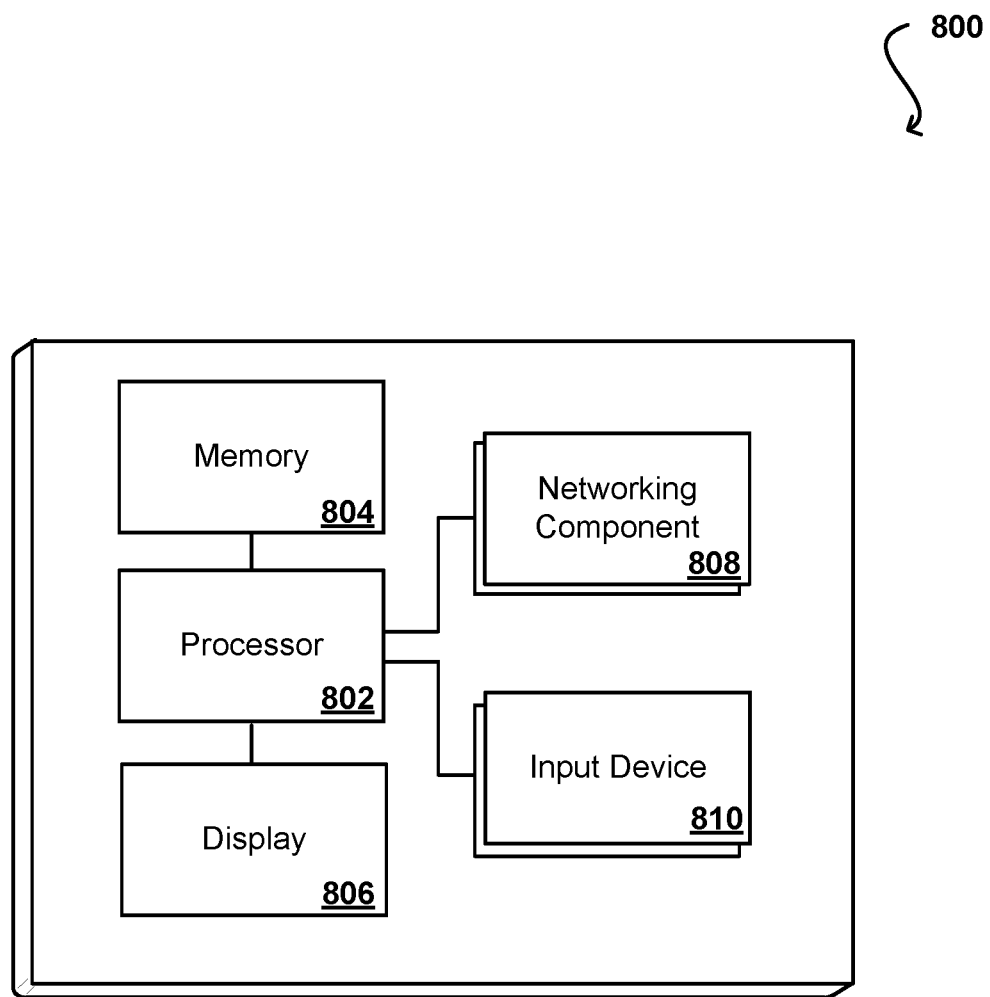
FIG. 8 illustrates example components of a computing device that can be used to implement aspects of various embodiments.

FIG. 8 illustrates a set of basic components of an example computing device 800 that can be utilized to implement aspects of the various embodiments. In this example, the device includes at least one processor 802 for executing instructions that can be stored in a memory device or element 804. As would be apparent to one of ordinary skill in the art, the device can include many types of memory, data storage or computer-readable media, such as a first data storage for program instructions for execution by the at least one processor 802, the same or separate storage can be used for images or data, a removable memory can be available for sharing information with other devices, and any number of communication approaches can be available for sharing with other devices. The device may include at least one type of display element 806, such as a touch screen, electronic ink (e-ink), organic light emitting diode (OLED) or liquid crystal display (LCD), although devices such as servers might convey information via other means, such as through a system of lights and data transmissions. The device typically will include one or more networking components 808, such as a port, network interface card, or wireless transceiver that enables communication over at least one network. The device can include at least one input device 810 able to receive conventional input from a user. This conventional input can include, for example, a push button, touch pad, touch screen, wheel, joystick, keyboard, mouse, trackball, keypad or any other such device or element whereby a user can input a command to the device. These I/O devices could even be connected by a wireless infrared or Bluetooth or other link as well in some embodiments. In some embodiments, however, such a device might not include any buttons at all and might be controlled only through a combination of visual and audio commands such that a user can control the device without having to be in contact with the device.

As discussed, different approaches can be implemented in various environments in accordance with the described embodiments. As will be appreciated, although a Web-based environment is used for purposes of explanation in several examples presented herein, different environments may be used, as appropriate, to implement various embodiments. The system includes an electronic client device, which can include any appropriate device operable to send and receive requests, messages or information over an appropriate network and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server for receiving requests and serving content in response thereto, although for other networks, an alternative device serving a similar purpose could be used, as would be apparent to one of ordinary skill in the art.

The illustrative environment includes at least one application server and a data store. It should be understood that there can be several application servers, layers or other elements, processes or components, which may be chained or otherwise configured, which can interact to perform tasks such as obtaining data from an appropriate data store. As used herein, the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server in the form of HTML, XML or another appropriate structured language in this example. The handling of all requests and responses, as well as the delivery of content between the client device and the application server, can be handled by the Web server. It should be understood that the Web and application servers are not required and are merely example components, as structured code discussed herein can be executed on any appropriate device or host machine as discussed elsewhere herein.

The data store can include several separate data tables, databases or other data storage mechanisms and media for storing data relating to a particular aspect. For example, the data store illustrated includes mechanisms for storing content (e.g., production data) and user information, which can be used to serve content for the production side. The data store is also shown to include a mechanism for storing log or session data. It should be understood that there can be many other aspects that may need to be stored in the data store, such as page image information and access rights information, which can be stored in any of the above listed mechanisms as appropriate or in additional mechanisms in the data store. The data store is operable, through logic associated therewith, to receive instructions from the application server and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on the user device. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated. Thus, the depiction of the systems herein should be taken as being illustrative in nature and not limiting to the scope of the disclosure.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, FTP, UPnP, NFS, and CIFS. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle®, Microsoft®, Sybase® and IBM® as well as open-source servers such as MySQL, Postgres, SQLite, MongoDB, and any other server capable of storing, retrieving and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, magnetic tape drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and other non-transitory computer readable media for containing code, or portions of code, can include any appropriate media known or used in the art, such as but not limited to volatile and non-volatile, removable and non-removable media implemented in any method or technology for storage of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method, comprising:
analyzing a plurality of actions detected in an electronic environment over an initial learning period, the plurality of actions being of at least one specified type;
generating a behavior profile using values determined for features representative of the plurality of actions;
determining, for at least a subset of the features, a respective mismatch value indicating a ratio of unexpected values to expected values for at least one feature of the subset of the features detected over a second learning period;
determining a first feature and a second feature where the respective mismatch value falls outside a range of acceptable mismatch values;
applying at least one first normalization method to the first feature, the at least one first normalization method causing additional information for one or more related types of data to be included in determining a new first mismatch value;
determining that the new first mismatch value falls within the range of acceptable mismatch values;
causing the first feature to remain included in the behavior profile;
applying at least one second normalization method to the second feature, the at least one second normalization method causing additional information for one or more related types of data to be included in determining a new second mismatch value;
determining that new second mismatch value for the second feature falls outside the range of acceptable mismatch values over a predetermined period of time, the second mismatch value monitored for convergence toward the range of acceptable mismatch values;
removing the second feature from the behavior profile, based at least in part on the new second mismatch value falling outside of the range of acceptable mismatch values;
detecting a subsequent action, corresponding to the at least one specified type, in the electronic environment, the subsequent action indicative of potentially anomalous behavior;
comparing values for the features of the subsequent action against the features of the behavior profile;
determining that a detected value for at least one feature for the subsequent action deviates from an expected value of a corresponding feature in the behavior profile by more than an acceptable amount; and
generating an alarm indicating potentially anomalous behavior in the electronic environment.

2. The computer-implemented method of claim 1, further comprising:
causing the first normalization method, corresponding to the new first mismatch value, to be associated with the first field in the behavior profile.

3. The computer-implemented method of claim 1, further comprising:
logging information for the subsequent action; and
using the information to update the expected values of the behavior profile.

4. The computer-implemented method of claim 1, further comprising:
monitoring the new first mismatch value during the second learning period at least until the first new mismatch value stabilizes to within a specified amount of variation.

5. The computer-implemented method of claim 1, further comprising:
determining a structure of a file associated with at least one action of the plurality of actions; and
flattening the file to determine the features representative of the at least one specified type.

6. A computer-implemented method, comprising:
processing a set of event data corresponding to one or more types of actions performed in an electronic environment;
generating, based at least in part upon the set of event data, a behavior profile indicating expected values for a set of features representative of a specific type of action of the one or more types of actions;
determining that a mismatch value for a determined feature, of the set of features, falls outside an acceptable mismatch value range;
applying a normalization method to the determined feature to determine a new mismatch value, the normalization method causing additional information for one or more related types of data to be included in determining the new mismatch value;
determining whether the new mismatch value falls outside the acceptable mismatch value range over a predetermined period of time, the new mismatch value monitored for convergence toward the acceptable mismatch value range;
removing the feature from the behavior profile, based at least in part on determining the new mismatch value falls outside the acceptable mismatch value range; and
providing the behavior profile to an analysis engine configured to detect anomalous behavior in subsequent actions of the specific type detected in the electronic environment.

7. The computer-implemented method of claim 6, further comprising:
causing the feature to remain included in the behavior profile if the new mismatch value falls within the acceptable mismatch value range.

8. The computer-implemented method of claim 6, further comprising:
determining the normalization method from a set of normalization methods based at least in part upon at least one of a type of the feature or a type of value expected for the feature.

9. The computer-implemented method of claim 6, further comprising:
receiving identification of the normalization method from a customer of the electronic environment who is associated with the behavior profile.

10. The computer-implemented method of claim 6, further comprising:
analyzing a plurality of actions detected in the electronic environment over an initial learning period, the actions being of at least the specific type; and generating the behavior profile using values determined for features representative of the actions.

11. The computer-implemented method of claim 6, further comprising:
   logging information for the subsequent actions; and
   using the information to update the expected values of the behavior profile.

12. The computer-implemented method of claim 6, further comprising:
   monitoring the new mismatch value during a second learning period at least until the mismatch value at least stabilizes to within a specified amount of variation.

13. The computer-implemented method of claim 6, further comprising:
   determining a structure of a file associated with the specific type of action; and
   flattening the file to determine the features representative of the specific type of action.

14. The computer-implemented method of claim 6, further comprising:
   detecting a subsequent action, corresponding to the specific type, in the electronic environment;
   comparing values for the features of the subsequent action against the features of the behavior profile;
   determining that a detected value for at least one feature for the subsequent action deviates from an expected value of a corresponding feature in the behavior profile by more than an acceptable amount; and
   performing a determined action.

15. The computer-implemented method of claim 14, wherein the determined action includes at least one of generating a notification, logging information, generating an alarm, blocking access, or modifying an access credential.

16. The computer-implemented method of claim 6, further comprising:
   receiving, from a customer of the electronic environment, indication of at least one feature to exclude from the behavior profile.

17. A system, comprising:
   at least one processor; and
   memory including instructions that, when executed by the at least one processor, cause the system to:
      process a set of event logs corresponding to a specific type of action performed in an electronic environment;
      generate a behavior profile indicating expected values for a set of features representative of the specific type of action, based at least in part upon the set of event logs;
      determine that a mismatch value for a determined feature, of the set of features, falls outside an acceptable mismatch value range over a predetermined period of time, the new mismatch value monitored for convergence toward the acceptable mismatch value range;
      apply a normalization method to the determined feature to determine a new mismatch value, the normalization method causing additional information for one or more related types of data to be included in determining the new mismatch value;
      determine whether the new mismatch value falls outside the acceptable mismatch value range;
      remove the feature from the behavior profile, based at least in part on determining the new mismatch value falls outside the acceptable mismatch value range; and
      provide the behavior profile to an analysis engine configured to detect anomalous behavior in subsequent actions of the specific type detected in the electronic environment.

18. The system of claim 17, wherein the instructions when executed further cause the system to:
   cause the feature to remain included in the behavior profile if the new mismatch value falls within the acceptable mismatch value range.

19. The system of claim 17, wherein the instructions when executed further cause the system to:
   analyze a plurality of actions detected in the electronic environment over an initial learning period, the actions being of at least the specific type; and
   generate the behavior profile using values determined for features representative of the actions.

20. The system of claim 17, wherein the instructions when executed further cause the system to:
   detect a subsequent action, corresponding to the specific type, in the electronic environment;
   compare values for the features of the subsequent action against the features of the behavior profile;
   determine that a detected value for at least one feature for the subsequent action deviates from an expected value of a corresponding feature in the behavior profile by more than an acceptable amount; and
   perform a determined action, wherein the determined action includes at least one of generating a notification, logging information, generating an alarm, blocking access, or modifying an access credential.

* * * * *